United States Patent
Pirotte

(10) Patent No.: US 6,588,472 B2
(45) Date of Patent: Jul. 8, 2003

(54) TIRE WITH ASYMMETRICAL CROWN REINFORCEMENT AND METHOD OF MOUNTING TIRE ON VEHICLE

(75) Inventor: Pascal Pirotte, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 09/925,003

(22) Filed: Aug. 8, 2001

(65) Prior Publication Data

US 2002/0050315 A1 May 2, 2002

(30) Foreign Application Priority Data

Aug. 10, 2000 (FR) .............................................. 00 10543

(51) Int. Cl.$^7$ .............................. B60C 9/30; B60C 11/03
(52) U.S. Cl. .................... 152/209.8; 152/455; 152/526; 152/528; 152/531; 152/534
(58) Field of Search ................................ 152/455, 456, 152/526, 531, 209.8, 534, 535, 528, 529, 536

(56) References Cited

U.S. PATENT DOCUMENTS

| 3,231,000 A | 1/1966 | Massoubre |
| 3,254,693 A | 6/1966 | Travers |
| 3,435,874 A | 4/1969 | Mirtain et al. |
| 3,515,197 A | 6/1970 | Boileau |
| 3,789,898 A | 2/1974 | Montagne |
| 3,834,439 A | 9/1974 | Mirtain |
| 4,173,991 A | 11/1979 | Mirtain |
| 5,971,048 A | 10/1999 | Ashmore et al. |

FOREIGN PATENT DOCUMENTS

GB 1115546 5/1968

Primary Examiner—Adrienne C. Johnstone
(74) Attorney, Agent, or Firm—Baker Botts L.L.P.

(57) ABSTRACT

A tire having a preferential fitting direction to a passenger car, the tire having a carcass reinforcement that extends from one tire bead to the other and, radially outside, a crown reinforcement of width Ls, formed by at least two crown plies, and in addition a meridian reinforcing ply arranged radially between the carcass reinforcement and the crown reinforcement, the meridian reinforcing ply having a width Lr between 15% and 45% Ls of the crown reinforcement, one edge of the reinforcing ply being located a distance D1 from the equatorial plane of the tire between 35% and 50% of Ls, while the other edge is located between the first edge and the equatorial plane of the tire. A method of mounting a group of four such tires on a vehicle.

14 Claims, 2 Drawing Sheets

TIRE WITH ASYMMETRICAL CROWN REINFORCEMENT AND METHOD OF MOUNTING TIRE ON VEHICLE

BACKGROUND OF THE INVENTION

The invention concerns radial tires whose crown is reinforced under the tread by means of superimposed plies of cords or cables which, in what follows, constitute the crown reinforcement. It also concerns a method for mounting a train of tires on a road vehicle.

As a general rule a tire for a passenger car comprises a radial carcass reinforcement anchored in two tire beads and covered radially by a crown reinforcement, itself covered radially by a tread designed to come into contact with the road during rolling. The crown reinforcement comprises at least two plies, known as working plies, each ply being composed of a plurality of cords or cables essentially parallel to one another within one ply, the cords or cables of one ply being crossed over relative to the cords or cables of the adjacent ply or plies.

To improve the general rolling characteristics of a vehicle fitted with tires, it is known to use tires having structural asymmetries.

To solve a wear problem on a vehicle rolling on a path with relatively small radii of curvature, FR 1.342.822 describes the formation of an asymmetrical crown reinforcement in which that the transverse rigidity of the tread decreases from one edge to the other with the less rigid portion facing outwards on the vehicle to which the said tire is fitted. To obtain this asymmetry, it is proposed among the examples described, to form a crown reinforcement with one ply extending across the full width of the tread and a second ply across only part of the said width, so as to confer on the said tread a greater transverse rigidity on one side than on the other.

Although interesting in terms of rolling behavior performance on the vehicle, the presence of asymmetrical rigidity in a tire has certain disadvantages and in particular that of drift when the said vehicle is rolling in a straight line (that is to say, a stress distribution in the tread essentially equivalent to that produced when going around a curve). This leads to contact forces which are detrimental from the standpoint of tire tread wear; the forces exerted by the road on the vehicle's tires also cause the vehicle to veer (that is, it deviates progressively from its path during rolling in a straight line).

To address this problem, FR 1.444.271 proposes a means to attenuate the effects of an asymmetrical structure when rolling in a straight line, by superimposing over the said structure a second asymmetry in order to counterbalance the effects of the first asymmetry while preserving good rolling behavior performance around bends for example, due to the presence of the first asymmetry. The examples described involve either the addition of a supplementary reinforcement element (carcass ply extending beneath the crown reinforcement), or additional thickness of the tread located over only part of the said tread.

SUMMARY OF THE INVENTION

The purpose of the present invention is to propose an asymmetrical tire structure that performs well both when rolling on bends and when travelling in a straight line, the said structure considerably reducing the lateral pull of a vehicle fitted with this type of tire and therefore avoiding the appearance of irregular wear linked for example to drift while rolling in a straight line. It has been found that by choosing particular values for a certain number of parameters, a considerable performance improvement can be obtained while preserving some asymmetry of the tire's structure without making the said tire any heavier.

This objective is achieved with a tire that has a preferred direction of fitting to a road vehicle. The tire comprises two tire beads, a crown and two side-walls that connect the beads and the crown, the said tire having a carcass reinforcement that extends from one bead to the other and, radially outside it, a crown reinforcement of width Ls formed by a stack of at least two crown plies, each of these crown plies having a width equal to or greater than Ls and comprising a plurality of cords or cables arranged parallel to one another along essentially the same direction, the said cables crossing over from one ply to the next.

This tire also comprises a meridian reinforcing ply arranged radially between the carcass reinforcement and the crown reinforcement, and comprising a plurality of cords or cables essentially parallel to one another and making with respect to the circumferential direction an average angle between 50° and 90°, the said ply being of width Lr measured between a first edge and a second edge, both edges being located on the same side relative to the equatorial plane of the tire.

The tire is characterized in that it comprises marking to indicate the side of the tire on which the meridian reinforcing ply is located (e.g., "inner side"), this marking enabling the said ply to be positioned on the inside of the vehicle when the tire is mounted on the said road vehicle.

The width Ls of the crown reinforcement is taken as the smallest of the widths of the crown plies, and corresponds to the effective width of the tire, that is, the width over which there is mechanical coupling between the crown plies.

While the state of the known prior art discloses tires with crowns comprising plies called triangulation plies and arranged symmetrically relative to the equatorial plane of the said tires, the present invention proposes a novel and not obvious solution which consists in associating the presence of a single meridian reinforcing ply with an indication of the necessary position of this ply relative to the vehicle, once the tire has been fitted to the vehicle, that will lead to good rolling performances both in a straight line and when rounding bends, without giving rise to undesirable wear and lateral pull effects.

Various marking means can be used, in particular marking on one side-wall of the tire to indicate the side on which the meridian reinforcing ply is located, a specific marking on the outside or inside surface of the tire indicating the side of the tire that must be positioned outwards or inwards on the vehicle, granted that the meridian reinforcing ply has to be on the inside.

With the tire according to the invention, the following characteristics can also be applied, alone or in combination:
- the width Lr of the meridian reinforcing ply is between 15% and 45% of Ls;
- the first edge of this meridian reinforcing ply is located a distance D1 from the equatorial plane between 35% and 50% of Ls, while the second edge of the meridian reinforcing ply is located between the first edge and the equatorial plane of the tire;
- the mean compression rigidity of the meridian reinforcing ply in the direction of the cords or cables of the said ply is higher than 1 Gpa, this rigidity being obtained by multiplying the compression rigidity of a single cord or cable by the number of cords or cables per unit length of the ply.

The combination of the parameters mentioned above makes it possible to benefit from the advantages of an asymmetrical tire structure without the need for additional means to counterbalance the effects of the drift induced during rolling in a straight line. The advantage of a tire according to the invention is significant, since the phenomena of irregular wear while rolling in a straight line (in the sense of wear localized in certain areas of the tread) are appreciably reduced.

If Lr is less than 15% of Ls, the reinforcing effect of the additional meridian reinforcing ply is insufficient for its effect on the tire to be measured; if Lr is more than 45% of Ls, when the tire is rotating at high speed effects are induced which can affect the tire's rolling performance adversely.

Similarly, to avoid any blockage in the radial direction of the median portion of the tire's crown when it is rotating about its axis, it is preferable to provide that the second edge of the meridian reinforcing ply is located at a distance D2 from the equatorial plane larger than one-third of Lr.

When a tire according to the invention is rotating at a high speed, the presence of a meridian reinforcing ply has an effect by virtue of its additional mass alone compared with the same tire without the said ply. To reduce this effect as much as possible, it is preferable to provide that the edge of the meridian reinforcing ply furthest away from the equatorial plane is located a distance D1 from the said plane between 35% and 45% of the total width Ls of the crown reinforcement.

To lighten the crown reinforcement and hence also the tire substantially, it is advantageous to provide that the crown reinforcement embodies at least two crown plies, each crown ply being composed of a rubber matrix reinforced by a plurality of textile cords or cables arranged parallel to one another along essentially the same direction, the meridian reinforcing ply being reinforced by metallic wires or cables. This arrangement makes it possible to confer upon the crown reinforcement a satisfactory level of flexural rigidity on edge, also making it possible to reduce considerably the rolling resistance of a tire comprising the said crown reinforcement. The same positive results are achieved if rubber mixes having low modulus of elasticity are used in combination, the said mixes covering the textile cables of the working plies.

Preferably, the rubber mix of the crown reinforcement plies and of the meridian reinforcing ply has a tensile modulus at 10% deformation and ambient temperature below 12 Mpa, and a loss at 60° C. below 25%.

Advantageously, the width Lr of the additional reinforcing ply with essentially meridian orientation is between 20% and 35% of the effective width of the crown reinforcement comprising the plies known as working plies.

An optimum effect is achieved when the mean angle of the reinforcements (in the form of cords or cables) of the additional meridian reinforcing ply is between 70° and 90°, the said angle being measured relative to the equatorial plane perpendicular to the rotation axis of the tire and passing through the middle of the width of the crown reinforcement.

In addition, radially between the crown reinforcing ply and the carcass reinforcement there may be arranged a rubber section with a thickness between 0.3 and 1 mm (this thickness being measured radially above the axially outermost edge of the reinforcing ply), having a tensile modulus at 10% deformation, measured under normal test conditions and at ambient temperature, at least equal to 5 Mpa and at most equal to 15 Mpa, the said section extending continuously in the circumferential direction and, when viewed in a radial section plane (i.e. one containing the rotation axis of the tire), having its axially innermost edge located at a distance from the equatorial plane smaller than the distance of the axially outermost edge of the reinforcing ply measured relative to the same equatorial plane.

It is also interesting to associate with the tire according to the invention the presence of a tread pattern, that part, for example half of the said tread situated radially on the outside of the additional, meridian reinforcing ply being provided with a pattern of its own formed of relief elements, the said pattern having a tread rigidity less than that of the other half of the tread; in this case, the thicknesses of the tread are essentially constant across the full width of the said tread. "Tread rigidity" means essentially the rigidity of the tread when the tire according to the invention is subjected to drift forces under normal conditions of use (inflation pressure and supported load).

In addition, a method is proposed for mounting a group of four tires with asymmetrical structure, that gives improved rolling performance around bends while reducing the tire wear and the lateral pull of the vehicle, each tire having two beads, a crown and two side-walls that connect the beads to the crown and each tire having a carcass reinforcement which extends from one bead to the other and, radially outside this, a crown reinforcement of width equal to Ls, formed by a stack of at least two crown plies, each of the said crown plies having a width greater than or equal to Ls and being composed of a plurality of cords or cables arranged parallel to one another along essentially the same direction, with the cables crossed over from one ply to the next.

Each tire also comprises a meridian reinforcing ply positioned radially between the carcass reinforcement and the crown reinforcement and formed of a plurality of cords or cables essentially parallel to one another and forming an average angle with respect to the circumferential direction between 50° and 90°, this ply of width Lr being situated entirely on one side of the equatorial plane of the tire.

The method according to the invention involves mounting four tires as described, in such manner that the meridian reinforcing ply of each tire mounted on the vehicle is located on the inside of the vehicle, i.e. between the inside of the vehicle and the equatorial plane of the tire.

By definition, the equatorial plane is the plane perpendicular to the tire's rotation axis that passes through the middle of the crown reinforcement.

Preferably, the width Lr, measured between a first edge and a second edge, is between 15% and 45% of Ls, the first edge of this meridian reinforcing ply being located a distance D1 from the equatorial plane of the tire between 35% and 50% of Ls, and the second edge of the meridian reinforcing ply being situated between the first edge and the equatorial plane of the tire.

Preferably, for each tire the mean compression rigidity of the meridian reinforcing ply in the direction of its cords or cables is greater than 1 Gpa, this rigidity being obtained by multiplying the compression rigidity of a single cord or cable by the number of cords or cables per unit length of the ply.

The method proposed, according to which the meridian reinforcing plies of the four tires of a vehicle are positioned towards the inside of the vehicle, also applies to the fitting of the tires of the front axle of the said vehicle, although it does not result in the same performance level for the vehicle.

DESCRIPTION OF THE DRAWINGS

A non-limiting example of practical application is presented below with the attached drawings, in which.

DESCRIPTION OF PREFERRED EMBODIMENTS

Figure 1:
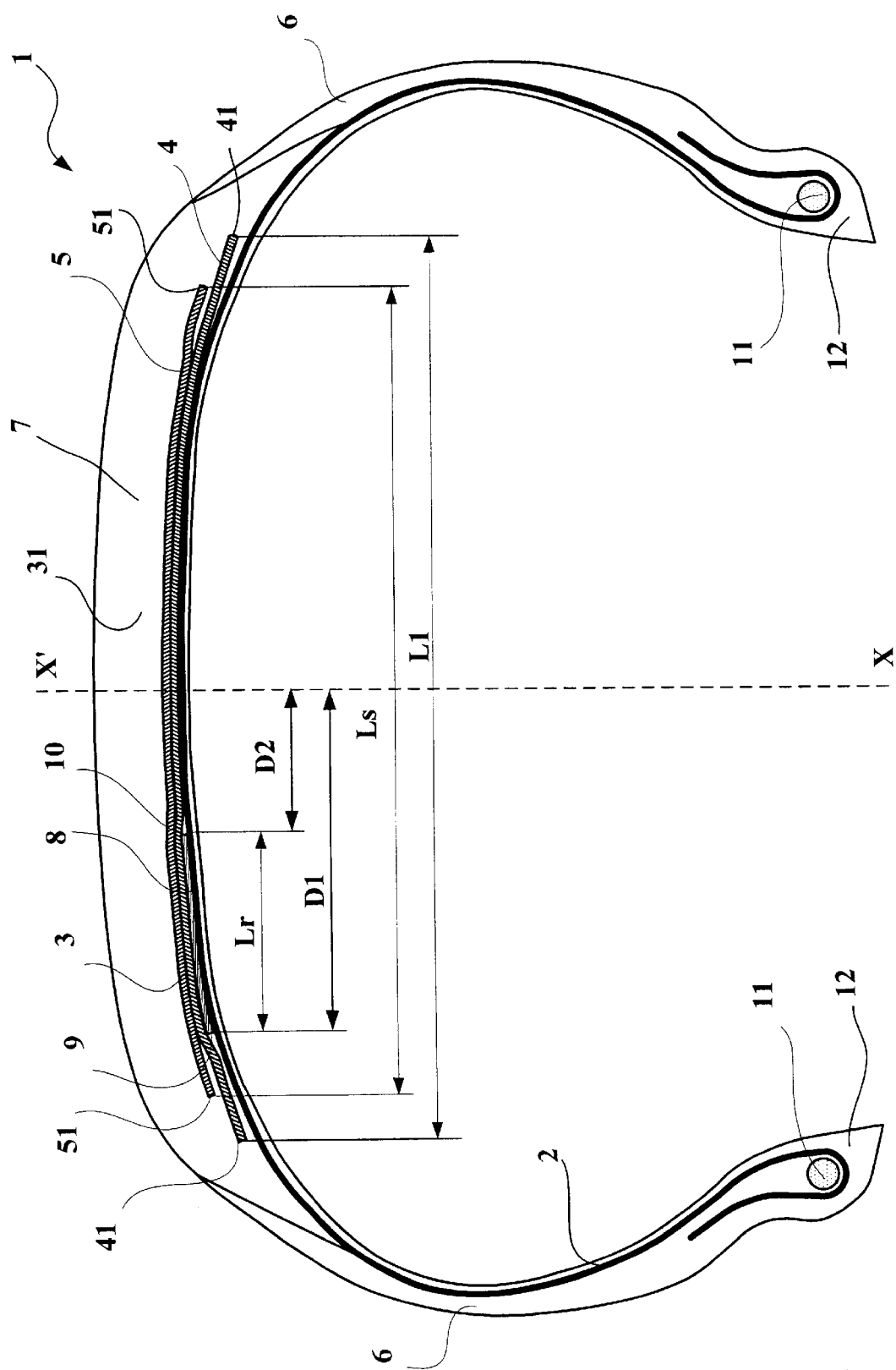
FIG. 1 shows a meridian section of a tire according to the invention comprising an additional meridian reinforcing ply.

FIG. 1 shows a meridian section of a passenger car tire 1 of size 195/65 R15 in which two tire beads 12 are extended by side-walls 6 which are connected to the two lateral edges of a tread 7. This tire 1 comprises a carcass reinforcement 2 extending from one bead to the other and anchored in each bead 12 by being turned up around an inextensible annular element 11. The carcass reinforcement 2, formed in this case of a ply of 144/2 PET cables orientated radially (i.e. making an angle equal or close to 90° with the equatorial plane), is covered in its median region and radially on the outside by a crown reinforcement 3 in turn covered by a tread 31 designed to come into contact with the road during rolling.

Figure 2:
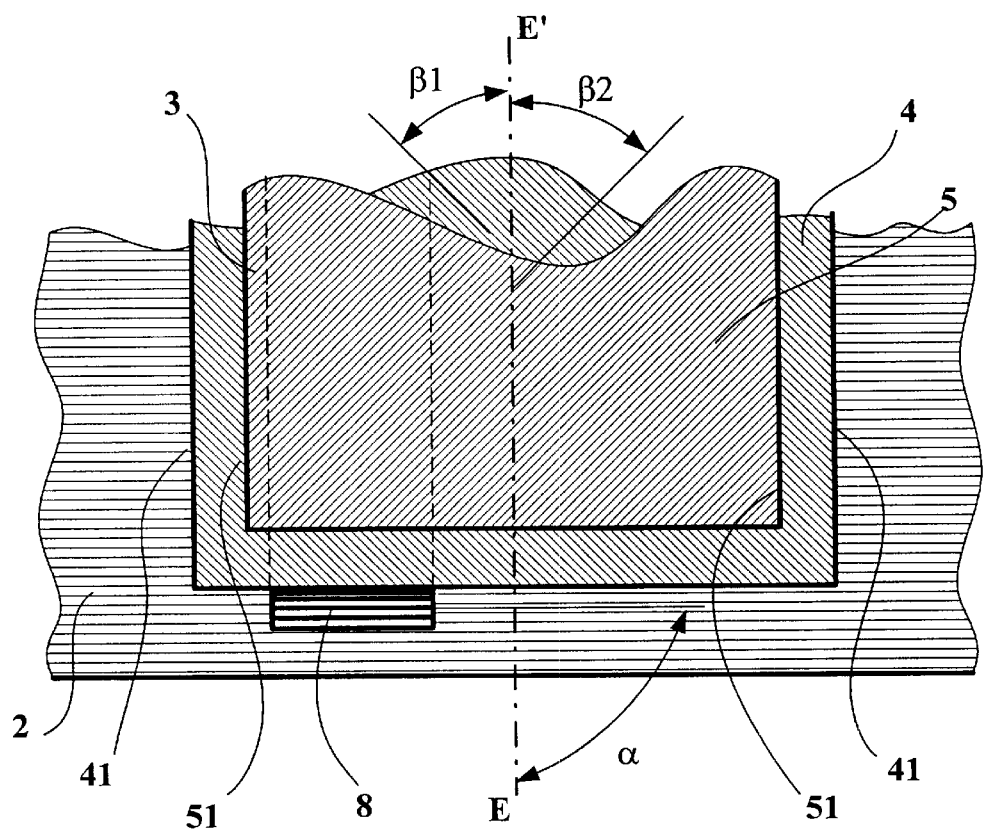
FIG. 2 is an exploded view showing the orientation of the cables of the various plies.

The crown reinforcement 3 of the tire is composed of a stack comprising a first and a second working ply 4, 5 each formed of a plurality of parallel cables, the said cables being metallic cables of formula 3-26 (three 26/100 wires); relative to the circumferential direction the cables of the first ply 4 make an angle β1 essentially equal to 25° and those of the second ply 5 make an angle β2 essentially equal to 25° (these angles being clearly visible in FIG. 2). In the present case, the first working ply 4 is located radially between the carcass ply 2 and the second working ply 5 and has a width L1 (measured between the edges 41 of the ply) greater than the width of the second ply. The effective width Ls of the crown reinforcement 3 in this example is defined as the width of the second working ply 5 (measured between the edges 51 of that ply).

In addition, arranged radially between the carcass ply 2 and the crown reinforcement 3, there is a meridian reinforcing ply 8 formed of a plurality of metallic cables of formula 3-26 identical to those used in the working plies (this ply being visible on the left of the tire section shown in FIG. 1, corresponding to the side of the tire intended to be positioned towards the inside of the vehicle). The meridian reinforcing ply 8, viewed in section in FIG. 1, comprises two edges, a first edge 9 close to one edge of the crown reinforcement 3 and a second edge 10 located between this first edge 9 and the equatorial plane, whose trace is marked XX' and has the following characteristics:

width L1: 160 mm; effective width of the crown Ls: 146 mm;

width Lr=40 mm (i.e. 27% of Ls);

distance D1 between the first edge of the meridian reinforcing ply 8 and the equatorial plane, equal to 60 mm (i.e. 41% of Ls);

distance D2 between the second edge of the meridian reinforcing ply 8 and the equatorial plane, equal to 20 mm;

angle of the reinforcing elements of the meridian reinforcing ply: 90°;

mean compression rigidity in the meridian direction of the meridian reinforcing ply 8 equal to 7 GPa. This rigidity is obtained by multiplying the compression rigidity of a single cable by the number of cables per meter of the said ply. The spacing of the cables in the reinforcing ply is equal to 2.0 mm.

The tire so described is intended for mounting on a vehicle in such manner that the side-wall positioned axially on the same side as the meridian reinforcing ply is positioned towards the inside of the vehicle, the other side-wall consequently facing the outside of the said vehicle.

Among the variants not shown, the first ply can be less wide than the second working ply and in this case the effective width Ls of the crown reinforcement is taken as the smaller of the widths of the said working plies. Another structural variant of the crown reinforcement comprises a working ply at least one edge of which is folded back over itself, with the meridian reinforcing ply preferably located on the side away from the folded back portion.

FIG. 2 shows schematically the carcass reinforcement 2, the working plies 4, 5 constituting the crown reinforcement 3 and the meridian reinforcing ply 8 for the tire described with reference to FIG. 1. The reference numbers used in FIGS. 1 and 2 are the same. In FIG. 2 the cables composing the first working ply 4 make an angle β1=25° with respect to the equatorial plane, whose trace in the plane of the figure is indicated by the line EE'; the cables of the second working ply 5 make an angle β2=25° relative to the equatorial plane. The steel cables of the reinforcing ply 8 make an angle α of 90°.

In the case when the cables of the meridian reinforcing ply make an angle α different from 90° relative to the equatorial plane, it is preferable for the said cables to have an orientation of the same sign as the angle of the reinforcing elements of the crown reinforcement ply radially above the said reinforcing ply (that is to say, the reinforcing elements of the said plies are inclined in the same direction relative to the equatorial plane).

Figure 3:
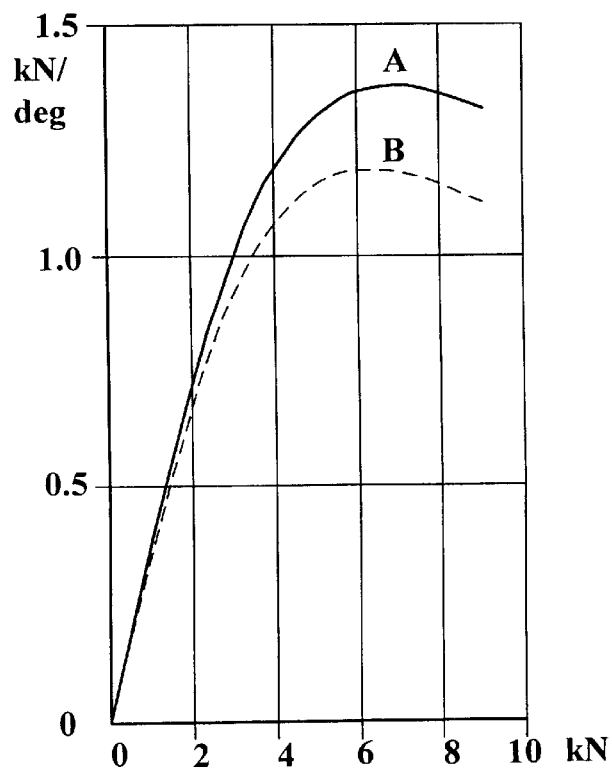
FIG. 3 shows the drift rigidities calculated for the tire presented in FIG. 1 compared with the drift rigidities calculated for the same tire with no meridian reinforcing ply.

FIG. 3 compares the drift rigidities for a degree of drift of a tire according to the invention of size 195/65 R15 and a tire of the same size without the meridian reinforcing ply, as a function of the load supported. Along the abscissa are plotted the loads supported by the two tires fitted to rims of size 6 J15 (according to the ETRTO standards) and inflated to 2.4 bars, the tires according to the invention being mounted on a vehicle in such manner that the meridian reinforcing ply is positioned towards the inside of the said vehicle. Along the ordinate axis is plotted the drift rigidity calculated as the value of the transverse force exerted by the road on the tire for a degree of drift. The curve A drawn with a full line corresponds to the tire according to the invention, while the curve B drawn with a broken line corresponds the tire having no meridian reinforcing ply. It is clearly apparent that the drift rigidity for a degree of drift is appreciably higher in the case of the tire according to the invention, this increase being the greater, the higher the load supported.

A variant embodiment not shown here consists in applying the principle of the invention to the case of a crown reinforcement of the tire comprising a first working ply located radially between the carcass and a second working ply, the said first ply being folded back over itself along at least one of its two axial edges so that it partially envelops at least one of the edges of the second working ply. In the case when one of the working plies is folded back along only one of its edges, it is preferable to position the additional meridian reinforcing ply on the side of the tire crown axially opposite the side comprising the fold-back.

In all the embodiments presented, and to limit the deformation of the tire crown at high speed, it is advisable to provide for the presence of at least one hooping cap ply at the crown, consisting of reinforcement elements orientated essentially parallel to one another along an essentially circumferential direction; preferably, the average number of reinforcement elements per unit length in the crown area comprising the crown reinforcing ply is smaller than the average number of reinforcement elements per unit length in the remainder of the crown.

In another variant of the invention, the meridian reinforcing ply may be interposed between two of the working plies. Needless to say, what has been described here should not be regarded as limiting and in particular, the crown reinforcement can be composed of a number of plies greater than two.

I claim:

1. A tire having a preferential mounting direction to a road vehicle and comprising two beads, a crown and two side-walls that connect the beads and the crown, the said tire having a carcass reinforcement extending from one bead to the other and, radially outside, a crown reinforcement of width equal to Ls, formed by a stack of at least two crown plies, each of these crown plies being of width at least equal to Ls and being composed of a plurality of cords or cables arranged parallel to one another along essentially the same direction, the cords or cables being crossed from one ply to the next, the said tire also comprising a meridian reinforcing ply positioned radially between the carcass reinforcement and the crown reinforcement and formed by a plurality of cords or cables essentially parallel to one another and making relative to the circumferential direction an average angle between 50° and 90°, this meridian reinforcing ply, of width Lr, having a first edge and a second edge, the said two edges being located on the same side of the tire, relative to the equatorial plane, the said tire being characterized in that it comprises marking to indicate the side of the tire on which the meridian reinforcing ply is to be positioned, the said marking serving to ensure positioning the said meridian reinforcing ply on the inside relative to the road vehicle when the said tire is mounted on the said vehicle.

2. A tire according to claim 1 wherein the width Lr of the meridian reinforcing ply is between 15% and 45% of Ls.

3. A tire according to claim 2 wherein the first edge of the meridian reinforcing ply is located a distance D1 from the equatorial plane of the tire between 35% and 50% of Ls, while the second edge is located between the first edge and the equatorial plane of the tire.

4. A tire according to claim 1 wherein the mean compression rigidity of the meridian reinforcing ply in the direction of the cords or cables of the said ply, is greater than 1 GPa, this rigidity being determined by multiplying the compression rigidity of a single cord or cable by the number of cords or cables per meter of the ply.

5. A tire according to claim 1 wherein said plurality of cords or cables in each crown ply are a plurality of textile cords or cables and said plurality of cords or cables in said meridian reinforcing ply are metallic wires or cables.

6. A tire according to claim 1 wherein the second edge of the meridian reinforcing ply is located relative to the equatorial plane at a distance D2 greater than one-third of Lr.

7. A tire according to claim 6 wherein the width Lr of the meridian reinforcing ply is between 20% and 35% of Ls.

8. A tire according to claim 1 wherein the cords or cables of the meridian reinforcing ply and the cords or cables of the ply of the crown reinforcement radially above the said meridian reinforcing ply are arranged at angles of the same sign.

9. A tire according to claim 1 wherein the average angle of the wires or cables of the meridian reinforcing ply relative to the circumferential direction is between 70° and 90°.

10. A tire according to claim 1 wherein the crown of the said tire comprises, radially on the outside, a tread made from a rubber mix designed to be in contact with the road during rolling, the said tread being divided in the axial direction in two parts, each part of the tread being provided with a pattern of its own formed of relief elements, the tread pattern of that part of the tread located radially outside the crown area comprising the said meridian reinforcing ply having a tread rigidity lower than that of the other part of the tread.

11. A tire according to claim 1 comprising, in addition, at least one crown hooping cap ply of reinforcement elements orientated essentially parallel to one another along an essentially circumferentially direction, the average number of reinforcing elements per unit length in the crown area comprising the meridian reinforcing ply being smaller than the average number of reinforcing elements per unit length in the remainder of the crown.

12. An assemblage of tires of asymmetrical structure for a road vehicle, each tire having two beads, a crown and two side-walls connecting the beads and the crown, each tire being reinforced by a carcass reinforcement extending from one bead to the other and, radially outside this, a crown reinforcement of width equal to Ls, formed by a stack of at least two crown plies, each of these crown plies having widths greater than or equal to Ls and being composed of a plurality of cords or cables arranged parallel to one another along essentially the same direction, the cords or cables being crossed over from one ply to the next, each tire having in addition a meridian reinforcing ply arranged radially between the carcass reinforcement and the crown reinforcement and formed by a plurality of wires or cables essentially parallel to one another and forming an average angle relative to the circumferential direction between 50° and 90°, the said meridian reinforcing ply having a width Lr, measured between a first edge and a second edge of the said ply, which is between 15% and 45% of Ls, the first edge of the said meridian reinforcing PLY being located a distance D1 from the equatorial plane of the tire equal to between 35% and 50% of Ls, while the second edge of the meridian reinforcing ply is located between the first edge and the equatorial plane of the tire, the said assemblage of tires being characterized in that each tire comprises marking to indicate the side of the tire on which the meridian reinforcing ply is to be positioned, the said marking serving to ensure positioning the said meridian reinforcing ply such that once in place on the vehicle, the meridian reinforcing ply of each tire is positioned on the side facing inwards on the vehicle, that is to say, between the inside of the vehicle and the equatorial plane of the tire.

13. A method of mounting on a vehicle a group of tires of asymmetrical structure, which enables the wear of the tires to be reduced, each tire having two beads, a crown and two side-walls connecting the beads and the crown, each tire having a carcass reinforcement extending from one bead to the other and, radially outside this, a crown reinforcement of width equal to Ls, formed by a stack of at least two crown plies, each of the said crown plies being of width greater than or equal to Ls and being composed of a plurality of cords or cables arranged parallel to one another along essentially the same direction, the cords or cables being crossed over from one ply to the next, each tire also comprising a meridian reinforcing ply arranged radially between the carcass reinforcement and the crown reinforcement and being formed by a plurality of wires or cables essentially parallel to one another and forming an average angle relative to the circumferential direction between 50° and 90°, the said meridian reinforcing ply having a width Lr, measured between a first edge and a second edge of the said ply, between 15% and 45% of Ls, the method according to the invention including mounting four tires of the type described in such manner that the meridian reinforcing ply of each tire is positioned towards the inside of the vehicle, that is to say, between the inside of the vehicle and the equatorial plane of the tire.

14. A method of mounting a group of tires according to claim 13, wherein for each tire, the first edge of the meridian reinforcing ply is located a distance D1 from the equatorial plane of the tire equal to between 35% and 50% of Ls, while the second edge of the meridian reinforcing ply is located between the first edge and the equatorial plane of the said tire.

* * * * *